(12) United States Patent
Desai et al.

(10) Patent No.: US 10,268,254 B2
(45) Date of Patent: Apr. 23, 2019

(54) SYSTEMS AND METHODS FOR EXTENDING BATTERY LIFE BY MONITORING MOBILE APPLICATION ACTIVITY

(71) Applicant: GOOGLE INC., Mountain View, CA (US)

(72) Inventors: Meghan Desai, San Francisco, CA (US); Dianne Hackborn, Mountain View, CA (US); Amith Yamasani, San Jose, CA (US); Paul Eastham, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/997,451

(22) Filed: Jan. 15, 2016

(65) Prior Publication Data

US 2017/0205870 A1 Jul. 20, 2017

(51) Int. Cl.
| | |
|---|---|
| *G06F 1/32* | (2006.01) |
| *G06F 1/3228* | (2019.01) |
| *G06F 1/3287* | (2019.01) |
| *G06F 1/329* | (2019.01) |
| *H04W 52/02* | (2009.01) |

(52) U.S. Cl.
CPC ............ *G06F 1/3228* (2013.01); *G06F 1/329* (2013.01); *G06F 1/3287* (2013.01); *H04W 52/0254* (2013.01); *Y02D 10/171* (2018.01); *Y02D 70/142* (2018.01); *Y02D 70/144* (2018.01); *Y02D 70/146* (2018.01); *Y02D 70/164* (2018.01); *Y02D 70/166* (2018.01)

(58) Field of Classification Search
CPC ... G06F 1/3228; G06F 1/329; H04W 52/0254
See application file for complete search history.

(56) References Cited

U.S. PATENT DOCUMENTS

| | | | |
|---|---|---|---|
| 8,438,412 B1 | 5/2013 | Givoly | |
| 8,935,697 B2 | 1/2015 | Berry | |
| 2004/0057290 A1* | 3/2004 | Monzel | G11C 7/065 365/189.05 |

(Continued)

FOREIGN PATENT DOCUMENTS

| | | |
|---|---|---|
| CN | 107045383 | 8/2017 |
| WO | 123414 | 7/2017 |

(Continued)

OTHER PUBLICATIONS

Zayed Rehman, "How to Use Titanium Backup for Android [Complete Guide]", addictivetips, Typescript. Sep. 8, 2011, http://www.addictivetips.com/mobile/how-to-use-titanium-backup-for-android-complete-guide/ Last Accessed: Feb. 9, 2016.

(Continued)

*Primary Examiner* — Vincent H Tran
*Assistant Examiner* — Mohammad A Rahman
(74) *Attorney, Agent, or Firm* — Colby Nipper (57) ABSTRACT

The disclosed technology includes techniques for preserving battery life of a mobile device by monitoring a mobile application to determine a state of inactivity. An inactive mobile application may be placed in an idle state that may prevent the mobile application from utilizing one or more resources of the mobile device that may tend to drain the battery.

19 Claims, 3 Drawing Sheets

(56) References Cited

U.S. PATENT DOCUMENTS

| | | | |
|---|---|---|---|
| 2010/0013551 A1 | 1/2010 | Reams | |
| 2010/0153524 A1* | 6/2010 | Rehm | H04L 67/1002 709/221 |
| 2010/0214278 A1 | 8/2010 | Miura | |
| 2011/0258467 A1* | 10/2011 | Antoci | G06F 1/1632 713/310 |
| 2011/0291748 A1* | 12/2011 | Li | G06F 1/3228 327/544 |
| 2012/0159209 A1* | 6/2012 | Stemen | G06F 1/329 713/320 |
| 2012/0210321 A1* | 8/2012 | Silva | H04N 21/233 718/100 |
| 2013/0091543 A1* | 4/2013 | Wade | G06F 21/54 726/1 |
| 2013/0208417 A1 | 8/2013 | Sirpal et al. | |
| 2013/0252597 A1 | 9/2013 | Jin et al. | |
| 2013/0347002 A1* | 12/2013 | Basu | G06F 9/485 718/107 |
| 2014/0237426 A1* | 8/2014 | Terazono | G06F 3/04817 715/810 |
| 2014/0351268 A1* | 11/2014 | Weskamp | G06F 17/217 707/748 |
| 2014/0359785 A1* | 12/2014 | Chandra | G06F 21/60 726/27 |
| 2015/0099546 A1 | 4/2015 | Heo et al. | |
| 2015/0160976 A1* | 6/2015 | Kim | G06F 9/4881 718/108 |
| 2015/0186661 A1* | 7/2015 | Hirase | G06F 21/6218 726/28 |
| 2015/0281950 A1* | 10/2015 | Carr | H04W 4/02 455/411 |
| 2015/0312317 A1* | 10/2015 | Wehrman | H04W 4/008 715/740 |
| 2016/0098697 A1* | 4/2016 | Dunsmore | G06Q 20/32 705/39 |
| 2017/0208549 A1 | 7/2017 | Desai et al. | |

FOREIGN PATENT DOCUMENTS

| | | |
|---|---|---|
| WO | 2017123412 | 7/2017 |
| WO | 2017123414 | 7/2017 |

OTHER PUBLICATIONS

Skipjacks, "[Guide] Insanely Better Battery Life When Idle—Battery Life Thread", xda, Typescript. Jul. 9, 2013, http://forum.xda-developers.com/showthread.php?t=2357417 Last Accessed: Feb. 9, 2016.

Briley Kenney, "[Android] Save battery by automatically turning off WiFi and Bluetooth when not in use with Wireless Minder" dotTech, Sep. 5, 2013, https://dottech.org/125862/android-review-wireless-minder-app/ Last Accessed: Feb. 9, 2016.

Matt "How to Extend Your Android Tablet's Battery Life When You're Not Using it", How-To Geek, Typescript. Mar. 4, 2015. Online at http://www.howtogeek.com/210993/how-to-extend-your-android-tablets-battery-life-when-youre-not-using-it/ Last Accessed: Feb. 9, 2016.

Battery Doctor (Battery Saver), Cheetah Mobile Inc., Google Play Store. Typescript. Online at https://play.google.com/store/apps/details?id=com.ijinshan.kbatterydoctor_en&hl=en Last Accessed: Feb. 9, 2016.

Fahad Khan, "12 Apps for Longer Battery Life [Android]", Hongkiai, Typescript. Online at http://www.hongkiat.com/blog/android-app-save-battery/ Last Accessed: Feb. 9, 2016.
Online at https://play.google.com/store/search?q=battery&c=apps&hl=en. Last Accessed: Feb. 9, 2016.
"Samsung Galaxy S4 tips and tricks—Battery Life, Multi-tasking and Keyboard", Typescript. Online at http://www.trustedreviews.com/opinions/samsung-galaxy-s4-tips-and-tricks_Page-2. Last Accessed: Feb. 9, 2016.
"Greenify", Oasis Feng, Google Play Store. Online at https://play.google.com/store/apps/details?id=com.oasisfeng.greenify&feature=nav_result%20-%20?t=W251bGwsMSwyLDNd Last Accessed: Feb. 9, 2016.
Michael Elsdorfer, "Auto Starts", Google Play Store. Online at https://play.google.com/store/apps/details?id=com.elsdoerfer.android.autostarts&hl=en Last Accessed: Feb. 9, 2016.
"Greenify—Android Apps on Google Play", Retrieved at: https://play.google.com/store/apps/details?id=com.oasisfeng.greenify&feature=nav_result%20-%20?t=W251bGwsMSwyLDNd—on Feb. 9, 2016.
"Battery Doctor (Battery Saver)", Cheetah Mobile, Inc. Google Play Store—Retrieved at—https://play.google.com/store/apps/details?id=com.ijinshan.kbatterydoctor_en&hl=en—on Feb. 9, 2016, 1 page.
"https://play.google.com/store/apps/details?id=com.elsdoerfer.android.autostarts&hl=en", Retrieved at: https://play.google.com/store/apps/details?id=com.elsdoerfer.android.autostarts&hl=en—on Feb. 9, 2016, 1 pages.
"Samsung Galaxy S4 tips and tricks—Battery Life, Multi-tasking and Keyboard", Retrieved at: http://www.trustedreviews.com/opinions/samsung-galaxy-s4-tips-and-tricks_Page-2—on Feb. 9, 2016, 12 pages.
"Battery Android Apps on Google Play", Retrieved at: https://play.google.com/store/search?q=battery&c=apps&hl=en—on Feb. 9, 2016, 3 pages.
Kenney,"[Android] Save battery by automatically turning off WiFi and Bluetooth when not in use with Wireless Minder", https://dottech.org/125862/android-review-wireless-minder-app/, Sep. 5, 2013, 5 pages.
Khan,"12 Apps For Longer Battery Life [Android]", Retrieved at: http://www.hongkiat.com/blog/android-app-save-battery/—on Feb. 9, 2016, 3 pages.
Klein,"How to Extend Your Android Tablet's Battery Life When You're Not Using it", https://www.howtogeek.com/210993/how-to-extend-your-android-tablets-battery-life-when-youre-not-using-it/, Mar. 4, 2015, 7 pages.
Skipjacks,"[Guide] Insanely Better Battery Life When Idle—Battery Life Thread", https://forum.xda-developers.com/showthread.php?t=2357417, Jul. 9, 2013, 16 pages.
Zayed,"How to Use Titanium Backup for Android [Complete Guide]", http://www.addictivetips.com/mobile/how-to-use-titanium-backup-for-android-complete-guide/, Sep. 8, 2011, 19 pages.
"Pre-Interview Communication", U.S. Appl. No. 14/997,386, dated Jun. 6, 2017, 5 pages.
"Written Opinion", PCT Application No. PCT/US2016/068861, dated Jul. 20, 2017, 8 pages.
"Foreign Office Action", European Application No. 16826859.7, dated Aug. 22, 2018, 3 pages.
"Non-Final Office Action", U.S. Appl. No. 14/997,386, dated Jun. 12, 2018, 19 pages.
"Final Office Action", U.S. Appl. No. 14/997,386, dated Oct. 25, 2017, 16 pages.
"International Search Report and Written Opinion", PCT Application No. PCT/US2016/068777, dated Mar. 23, 2017, 10 pages.
"Final Office Action", U.S. Appl. No. 14/977,386, dated Feb. 1, 2019, 15 pages.

\* cited by examiner

SYSTEMS AND METHODS FOR EXTENDING BATTERY LIFE BY MONITORING MOBILE APPLICATION ACTIVITY

BACKGROUND

Mobile applications that run on smart phones, tablets, and other such mobile devices can present a significant drain on battery life of the device, particularly when the mobile applications are constantly running in the background and/or accessing communications resources, such as a Wi-Fi or cellular network transceiver. With the ubiquity and ever-increasing number of such mobile applications, it is desirable to provide ways to preserve or extend mobile device battery life in order to maximize the usefulness of a mobile device.

Previous solutions allow a user to manage battery life of a mobile device by manually disabling or limiting functionalities of a mobile application running on a mobile device. Other solutions allow a user to track which mobile applications or device features drain the most battery life so that a user may selectively disable the mobile application/feature when the battery is low. Further, many mobile devices have a "power save" mode that when selected, can turn off selected features and applications that tend to drain the battery of the device.

While these solutions may be somewhat useful in extending a mobile device's battery life, they are also limited in that they often require the user to actively monitor remaining battery life and proactively take steps to limit battery usage. Further, by entirely disabling features and applications, the utility and functionality of the mobile device may be greatly limited. Thus, it would be desirable to provide a way to passively reduce unnecessary drain on the battery life of a mobile device that only deactivates features or applications of the mobile device when they are not being used.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein.

Embodiments of the disclosed technology include systems and methods for preserving battery life of a mobile device by deferring background network activity for mobile applications with which a user has not recently interacted. According to aspects of the present disclosure, battery draining functionalities may be restricted for a particular mobile application based on the individual activity of that particular mobile application, as opposed to the activity of the mobile device as a whole, which differs from known battery saving methods such as putting the mobile device into sleep mode or power saving mode. This may be accomplished by monitoring a mobile application of the mobile device to determine whether the mobile application is in an inactive state. An inactive state may indicate that a user may not be interested in using the mobile application in the near future. Thus, in situations where a user is not interested in using the mobile application in the near future, it may not be necessary for the mobile application to continue using certain battery draining features of the mobile device. As such, the mobile application may be placed in an idle state to preserve battery life it is determined that the mobile application is in an inactive state. An idle state may preserve battery life by restricting the functions that the mobile application may be able to perform.

A mobile application may be determined to be in an inactive state if it has not performed an active function within a predetermined period of time. Active functions, as used herein, may include for example, running a process in the foreground of the mobile device, outputting a notification for display to a user, or being launched by a user.

When placed in an idle state, a mobile application may be prevented from accessing one or more resources of the mobile device. A resource of the mobile device may refer to any feature, function, or piece of hardware, the use or execution of which may cause the battery to be drained of power. For example, preventing a mobile application from accessing one or more resources of the mobile device may include, for example, preventing the mobile application from accessing a network and/or delaying the execution of sync jobs. After being placed in an idle state, a mobile application may be removed from the idle state and restored to normal functionality upon the mobile application performing an active function such as being launched by a user, or upon the mobile device being plugged into a power source.

Throughout this disclosure, certain embodiments are described in exemplary fashion in relation to a mobile device, such as a smart phone. However, embodiments of the disclosed technology are not so limited. In some embodiments, the disclosed technique may be effective in conserving battery power in other mobile devices, such as, for example tablets or laptops.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for extending the battery life of a mobile device by monitoring a mobile application of the mobile device to determine whether the mobile application is in an inactive state, and will now be described with reference to the accompanying figures.

Figure 1:
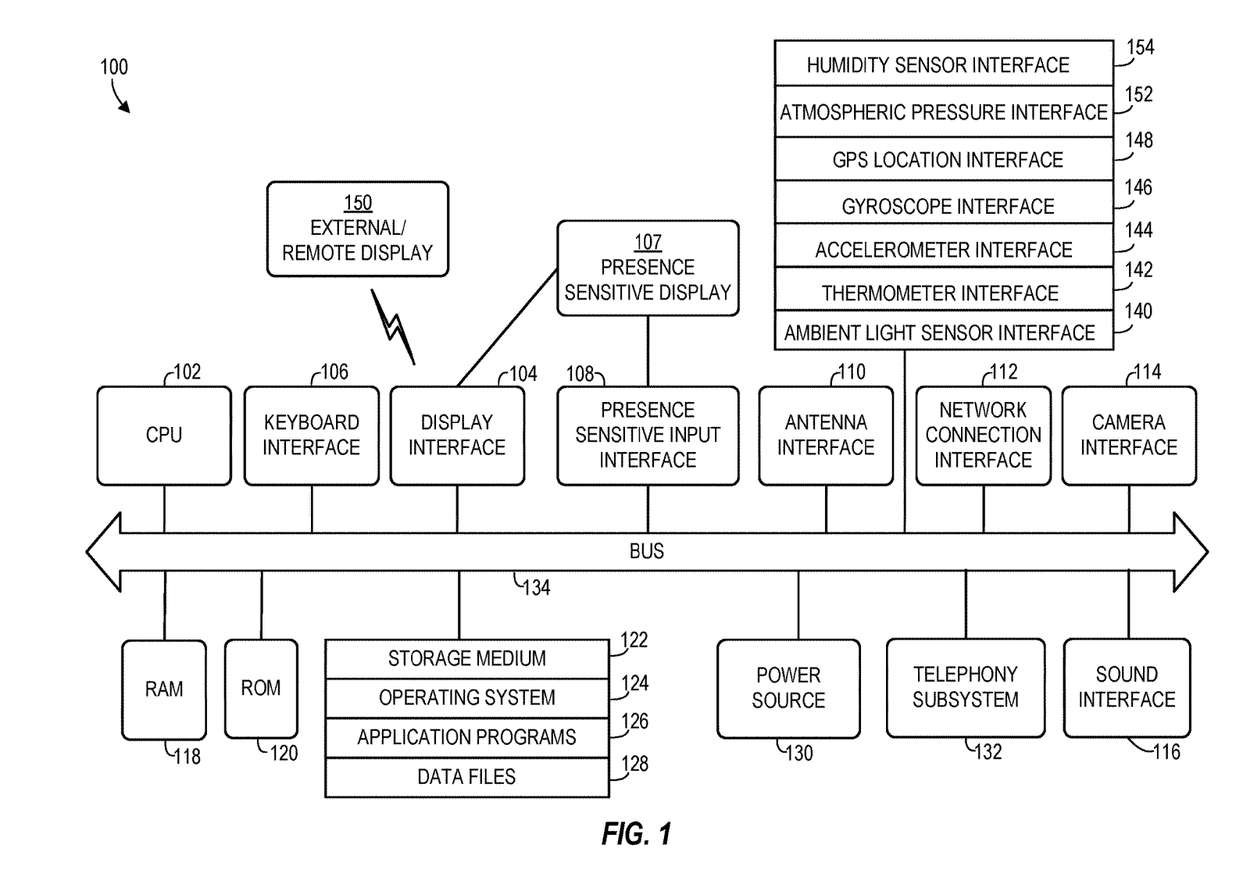
FIG. 1 is a block diagram of illustrative computing device architecture 100, according to an example implementation.
Figure 2:
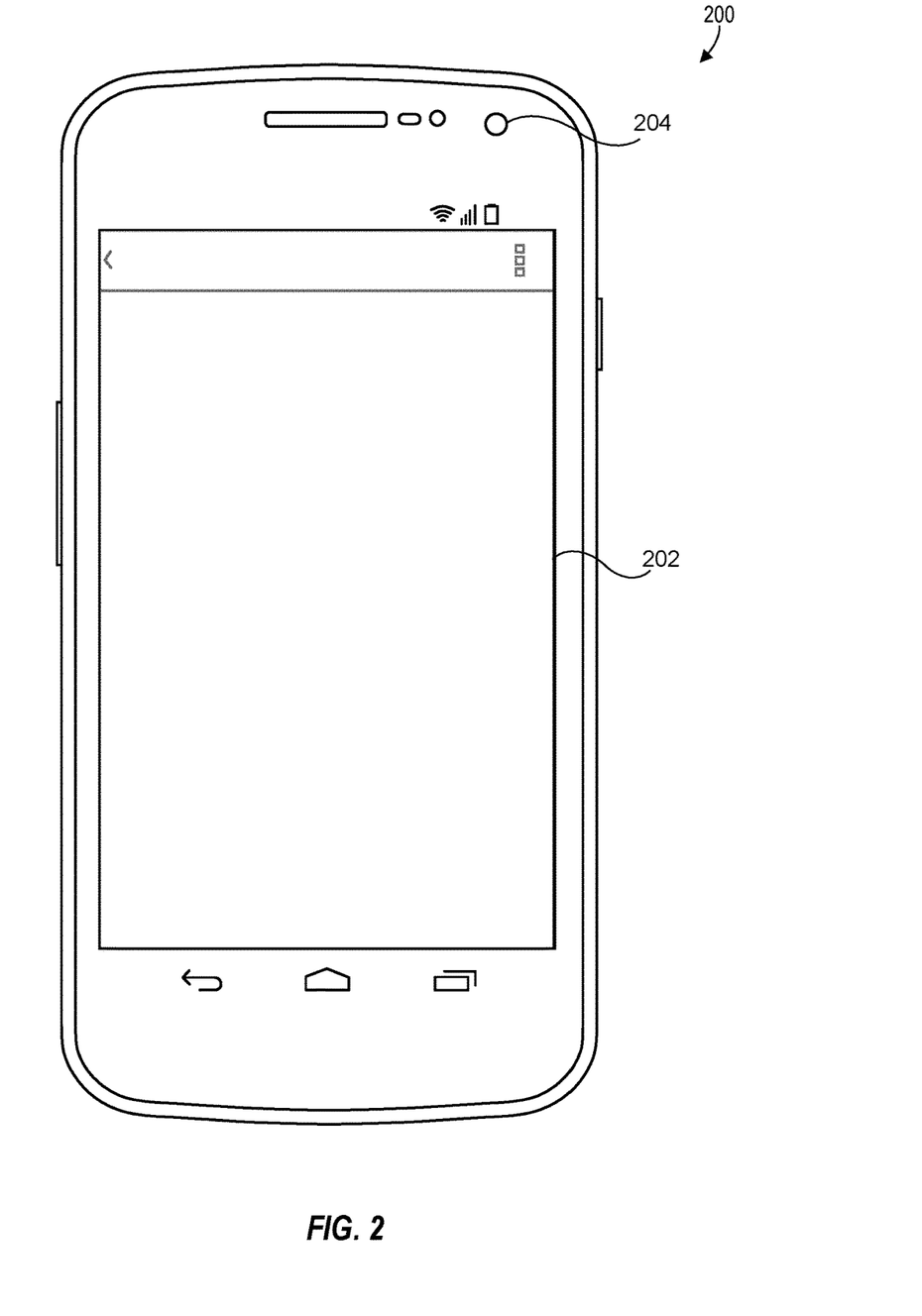
FIG. 2 illustrates a computing device 200, according to an example implementation

FIG. 1 depicts a block diagram of illustrative computing device architecture 100, according to an example embodiment. Certain aspects of FIG. 1 may be embodied in a computing device 200 (for example, a mobile computing device as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain embodiments of the disclosed technology, the display interface 104 may be directly connected to a local display, such as a touch-screen display associated with a mobile computing device. In another example embodiment, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain some embodiments, the display interface 104 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example embodiment, the computing device architecture 100 may include a presence-sensitive display interface 108 for connecting to a presence-sensitive display 107. According to certain some embodiments of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. In certain embodiments, a camera interface 114 is provided that acts as a communication interface and provides functions for capturing digital images from a camera. In certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

Example embodiments of the computing device architecture 100 may include various interfaces that provide communication interfaces to various sensors for data gathering. In certain embodiments, an ambient light sensor interface 140 is provided as a communication interface and provides functions for obtaining light data from an ambient light sensor. In certain embodiments, a thermometer interface 142 is provided as a communication interface and provides functions for capturing temperature data from a temperature sensor. In certain embodiments, an accelerometer interface 144 is provided as a communication interface and provides functions for obtaining accelerometer data from an accelerometer. In certain embodiments, a gyroscope interface 146 is provided as a communication interface and provides functions for obtaining gyroscope data from a gyroscope. In certain embodiments, a GPS location interface 148 is provided as a communication interface and provides functions for obtaining location data from a GPS receiver. In certain embodiments, an atmospheric pressure interface 152 is provided as a communication interface and provides functions for obtaining pressure data from a pressure sensor. In certain embodiments, a humidity interface 154 is provided as a communication interface and provides functions for obtaining humidity data from a humidity sensor.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the transmission and receipt of sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the mobile computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a mobile computing device 200, according to an example embodiment. As shown in FIG. 2, the computing device may be a mobile computing device, for example, a smartphone or a tablet. The mobile computing device 200 may have a built-in or integrated display 202 for presenting a graphical user interface (GUI) of a web browser. The display may be combined with a presence sensitive input device to form a touch-sensitive or presence-sensitive display for receiving user input from a stylus, finger, or other means of gesture input. In some embodiments, the mobile computing device 200 may also include or be associated with a sound producing device, such as a speaker, piezoelectric buzzer, or the like.

The mobile computing device 200 may be in communication with an image capture device 204 for capturing or recording content. As shown in FIG. 2, the computing device may include a built-in or internal image capture device, for example, a camera. The image capture device may include or be associated with an illumination device, for example, a flash device or IR beacon. In another example embodiment, the image capture device may be external to the computing device and in communication with the computing device, for example, through a direct connection, or wireless coupling.

In certain embodiments, the mobile computing device 200 may include one or more antennas or radios for wireless communication. These may include antennas for receiving GPS, Wi-Fi, or other radio communications. In addition, the mobile computing device may include one or more sensors for detecting, for example and without limitation, temperature, pressure, altitude, magnetic heading, etc.

As described herein, embodiments of the disclosed technology include techniques for extending the battery life of a mobile device by monitoring a mobile application to determine whether the mobile application is in an inactive state. Battery life can be preserved for example, by placing the mobile application into an idle state that may prevent the mobile application from accessing one or more resources of the mobile device. In some embodiments, the term "mobile application" may refer to applications that are not part of the operating system of the mobile device or are otherwise native to the mobile device, but that have been loaded onto the mobile device from an external source, such as, for example, a mobile application store.

According to some embodiments, a processor of a mobile device can determine that a mobile application of the mobile device has been in an inactive state for a predetermined period of time. The processor may make this determination by determining that mobile application has not been active (i.e., in an active state) for the predetermined period of time. In some embodiments, a processor may determine that a mobile application is active if the mobile application performs one or more active functions, such as, for example, running a process in the foreground of the mobile device, outputting a notification to a user, or being launched by a user. In some instances, a user may desire that a mobile application that would otherwise be determined to be in an inactive state nonetheless remain in an active state. As such, in some embodiments, a mobile application may remain active in response to receiving an indication of a user input instructing the mobile application to remain in an active state, despite the mobile application's failure to perform an active function during the predetermined time period. According to some embodiments, when a mobile application is in an active state, it may operate without the battery saving restrictions on functionality that may be imposed during an idle state, as described below.

According to embodiments of the present disclosure, a processor may determine that a mobile application is in an active state if the mobile application has a process that is currently running in the foreground of the mobile device. Those of skill in the art will understand that a mobile application that has a process running in the foreground may include a process that has been invoked by a user, or a process that has been invoked by another application that is currently running in the foreground of the mobile device. For example, if another application currently running in the foreground of the mobile device accessed the mobile application by for example, loading a contacts list of the mobile application, then a processor of the mobile device may determine that the mobile application is active because it is being used in the foreground. Background processes being run by a mobile application that include executing alarms, notifications, and broadcasting messages may not be considered to be processes that are running in the foreground and thus in some embodiments, a processor may determine that a mobile application running such background processes is not in an active state. Furthermore, mobile applications that execute tasks that are not a direct result of a user action or an interaction with another application that is currently running in the foreground, may not be considered to be running in the foreground and thus in some embodiments a processor may determine that a mobile application running such processes are not in an active state.

According to embodiments of the present disclosure, a processor may determine that a mobile application is in an active state if the mobile application outputs a notification to a user. For example, in some embodiments a processor may determine that a mobile application is in an active state if the mobile application outputs a visual notification on the screen 202 of the device (including a lock screen) or to a notification tray of the device, if the mobile application causes the mobile device to output an audio notification, such as a ring or a beep, if the mobile application causes the mobile device to output a tactile notification such as a vibration, or if the mobile application causes the mobile device to output any other such notification. In some embodiments, a processor may determine that a mobile application that has output a notification to a user is continuing to perform an active function until the user views the notification. For example, in some embodiments, a processor may determine that a notification that is on a mobile device's lock screen 202 or sitting in a notification tray is continuing to perform an active function until the processor receives an indication that the user has viewed the notification. In some embodiments, a processor may determine that the mobile application is in an active state after a notification is output to a user in response to detecting that the user has acknowledged the notification, by for example, opening or viewing the notification. In such cases, the processor may determine that the mobile application is in an inactive state until an indication of an acknowledgement of the notification by the user has been received by the processor.

According to embodiments of the present disclosure, a processor may determine that a mobile application is in an active state if the mobile application is launched by a user or otherwise interacted with by a user. For example, in some embodiments, a user may launch a mobile application by selecting an icon on the screen 202. According to some embodiments, a mobile application may be launched by a user by issuing a voice command to the mobile device, wherein the voice command contains an indication of the user to launch the mobile application. In some embodiments, a user may launch a mobile application by performing a gesture with the mobile device. In some embodiments, a user may launch a mobile application by sending a command to the mobile device from a remote device, such as a server.

According to embodiments of the present disclosure, a processor may determine that a mobile application is in an active state if the processor receives an indication that the mobile application has been designated to remain active by a user. This may be known as whitelisting a mobile application. For example, the mobile device may receive an indication from a user that the user desires the mobile application to remain in an active state, even if the mobile application fails to perform an active process during a predetermined period of time that may otherwise cause a processor of the mobile device to determine that the mobile application is in an inactive state. In some embodiments, mobile applications that have been designated by a user to remain in an active state may continue to, for example, execute notification listeners. According to some embodiments, the operating system or another mobile application may also be capable of requesting that a mobile application remain in an active state. In some embodiments, a processor may enable a whitelisted mobile application to retain some or all of the functionalities the mobile application otherwise would have lost when the mobile application is placed in an idle state.

As described above, a processor may determine that a mobile application is in an active state if the mobile application has not performed an active function during a predetermined time period. In some embodiments, the predetermined time period can be marked by the conventional passing of time ("conventional time"). Accordingly, in some embodiments, if the mobile application has not performed an active function in, for example, the previous three days, then a processor may determine that the mobile application is in an inactive state. In some embodiments, the processor may make this determination without regard to the activity or inactivity of the mobile device 200. For example, if the predetermined time period is three days, then the predetermined time period may be measured without regard to whether the mobile device 200 has experienced indications of inactivity, such as the screen 202 or the power being off, during the three days that make up the predetermined period of time. It will be understood by those of skill in the art that the predetermined period of time may vary among embodiments, but could refer to an hour, two hours, six hours, ten hours, one day, two days, three days, a week, or any other time period that may be suitable. Furthermore, according to some embodiments, the predetermined time period may be different from mobile application to mobile application. So, for example, a first mobile application may be associated with a first predetermined time period for inactivity and a second mobile application may be associated with a second predetermined time period for inactivity.

In some embodiments, the predetermined time period can be marked by time passing in relation to some condition of the mobile device ("conditional time"). Accordingly, in some embodiments, the predetermined time period can be marked by an amount of time that the mobile device has had the battery on and/or the screen 202 on. For example, in some embodiments, a processor may determine that the mobile application is in an active state if the mobile application has not performed an active function in the previous eight hours of time in which both the battery and/or the screen 202 of the mobile device were on. Thus, according to some embodiments where the predetermined period of time is measured in conditional time, the predetermined time period may be measured by subtracting out the time that the mobile device 200 has the screen 202 off and/or the power off from the amount of conventional time that has passed.

According to some embodiments, a processor of the mobile device can place a mobile application into an idle state in response to determining that that the mobile application is in an inactive state. It should be understood that a mobile application in an idle state also remains in an inactive state. In some embodiments, when a processor places a mobile application into an idle state, the processor may prevent the mobile application from accessing one or more resources of the mobile device. For example, in some embodiments, a processor may prevent a mobile application from accessing a network when in an idle state. Accessing a network may refer to wired or wireless access, but most advantageously refers to wireless access. In some embodiments, a processor may defer syncs, jobs, and/or alarms of a mobile application when the mobile application is in an idle state.

According to some embodiments, to prevent a mobile application from having network access, a processer of the mobile device may prevent the mobile application from utilizing a wireless transceiver of the mobile device to access, for example, a wireless or cellular network. For example, in some embodiments, there may be a firewall associated with a mobile application that determines whether or not the mobile application has network access. In some embodiments, the processor may activate the firewall to prevent the mobile application from having networks access. According to some embodiments, network access may refer to a mobile network, such as Wi-Fi, a cellular network, Bluetooth, WiMax, or any other such network. In some embodiments, network access may refer to a wired network that may connect to the mobile device 200 using, for example, an Ethernet cable.

In some embodiments, it may be typical for mobile applications to intermittently execute syncs, jobs, and alarms as a part of their normal functioning. For example, a sync or job may include retrieving an email, syncing a calendar item, or downloading an update to the application. An alarm executed by a mobile application may, for example, wake the CPU. According to embodiments of the present disclosure, a processor of the device may cause one or more sync, job, or alarm functions of a mobile application to be deferred when the mobile application is in an idle state. In some embodiments, the execution of the sync, job, or alarm functions can be deferred until a processor determines that the mobile application is in an active state. According to embodiments of the present disclosure, the operating system of the mobile device may buffer the sync, job, and alarm functions of a mobile application during the idle period for execution at a future time.

According to some embodiments, a mobile application that has been placed in an idle state in accordance with the present disclosure may continue to remain in an idle state until a processor determines that the mobile application has performed an active function. For example, in some embodiments, a processor of the mobile device may remove a mobile application from the idle state if the mobile application runs a process in the foreground of the mobile device, the mobile application causes the mobile device to output a notification to a user, or if the mobile application is launched by a user. In some embodiments, a processor may remove a mobile application from the idle state if the processor receives a signal indicating that the mobile device has been plugged into a power source. According to some embodiments, if a processor removes a mobile application from the idle state, the processor may grant the mobile application access to mobile device resources that were previously restricted during the idle state. In some embodiments, a mobile application that has been placed in an idle state by a processor may remain in the idle state for an indefinite period of time until a processor removes it from the idle state in response to receiving a signal indicating that the mobile application has performed some active function or the mobile device has been plugged into a power source as described above. In some embodiments, a processor may periodically remove a mobile application that has been placed in an idle state indefinitely from the idle state and grant the mobile application temporary access to mobile device resources to allow the mobile application to perform updates. In some embodiments, a processor may determine that a mobile application has been in an idle state for a predetermined time period, and may remove the mobile application from the idle state for some period of time. For example, in some embodiments the processor may place the mobile application in an idle state for one day and then remove it from the idle state for two minutes to allow it to perform updates, before placing the mobile application back in the idle state.

According to some embodiments, a processor may temporarily remove a mobile device or mobile application from an idle state in response to receiving a signal from another device or an application. For example, in some embodiments, if the mobile device receives a tickle, a processor of the mobile device may grant the mobile application network access and/or the ability to execute pending jobs, syncs, and/or alarms for a brief period of time. According to some embodiments, a tickle may be a push message delivered by a push messaging service. In some embodiments, the processor of the mobile device may grant the mobile application network access and/or the ability to execute pending jobs, syncs, and/or alarms for a brief period of time only if the tickle is associated with a particular classification, such as for example, a "high priority" tickle.

Figure 3:
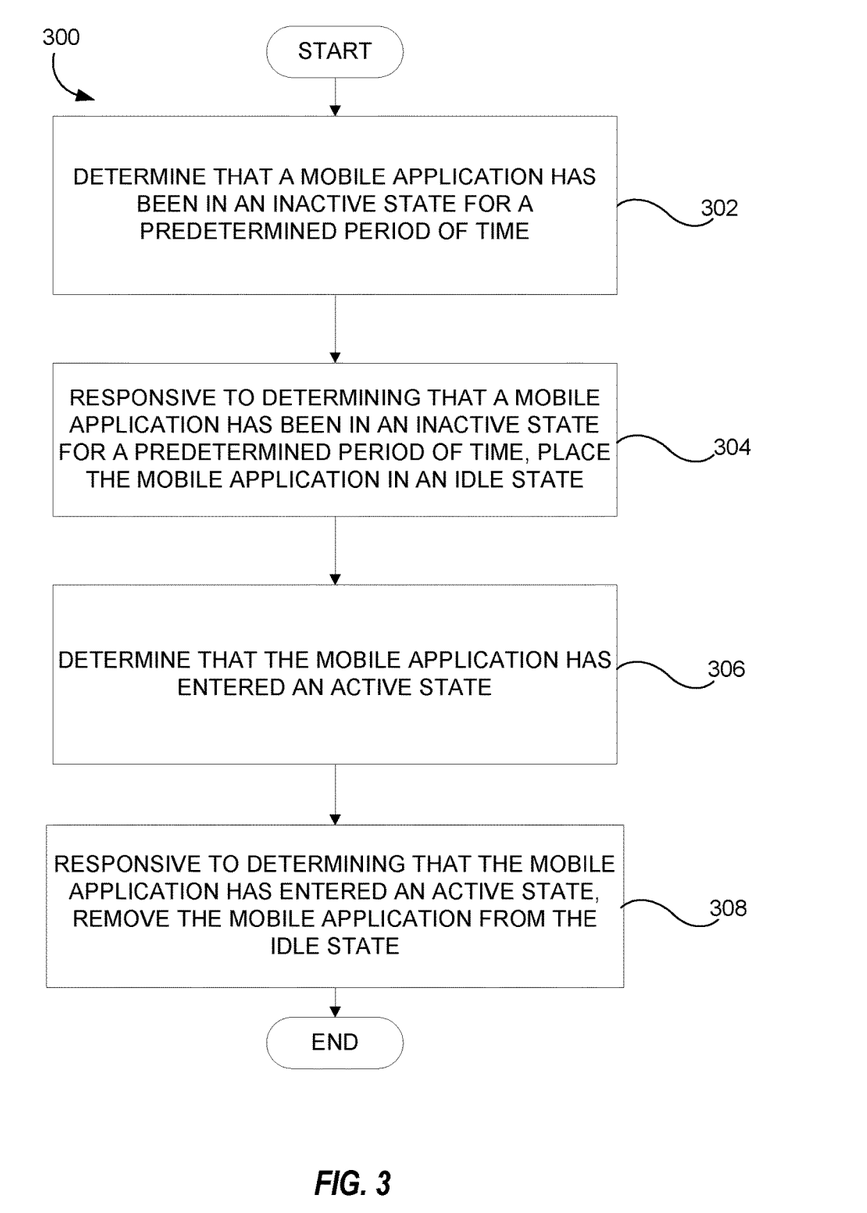
FIG. 3 is a flow diagram of a method 300, according to an example implementation.

FIG. 3 is a flow diagram of a method 300, according to an example implementation. As shown in FIG. 3, in some implementations, the method includes, at 302, determining that a mobile device application has been in an inactive state for a predetermined period of time. According to some implementations a predetermined period of time may be marked by conventional time or conditional time. At 304, the method can include causing a mobile application of the mobile device to enter an idle state. According to some embodiments, a processor of the mobile device may prevent the mobile application from accessing one or more resources of the mobile device when the mobile application is in an idle state. At 306, the method can include, determining that the mobile application has entered an active state. In some embodiments, a processor of the mobile device can determine that the mobile application has entered an active state upon determining that the mobile application has performed an active function or upon detecting that the mobile device has been plugged into a power source. Lastly, at 308, the method can include, responsive to the determining that the mobile application has entered an active state, removing the mobile application from the idle state. According to some embodiments, upon removing a mobile application from the idle state, a processor of the mobile device may grant the mobile application access to one or more resources of the mobile device that were previously restricted during the idle state.

It will be understood that the various steps shown in FIG. 3 are illustrative only, and that steps may be removed, other steps may be used, or the order of steps may be modified.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
   determining, by a processor of a computing device, that a mobile application has been in an inactive state, the determining based on a first predetermined time period during which the mobile application is granted access to, but does not invoke an active function accessing, one or more resources of the computing device;
   responsive to determining that the mobile application has been in the inactive state, placing, by the processor, the mobile application in an idle state, the idle state a state in which battery saving restrictions are imposed upon the mobile application that restrict the mobile application from accessing the one or more resources; and
   responsive to receiving a signal from another mobile application, temporarily removing, by the processor, the mobile application from the idle state based on a second predetermined time period and placing the mobile application in an active state for a duration of the second predetermined time period, the active state a state in which:
      the battery saving restrictions are removed from the mobile application and the mobile application is granted access to the one or more resources; and
      the mobile application completes the active function, the active function accessing the one or more resources to which the processor has granted access.

2. The method of claim 1, wherein determining that the mobile application has been in the inactive state determines that the mobile application has not had a process running in the foreground of the mobile device during the first predetermined time period.

3. The method of claim 1, wherein determining that the mobile application has been in the inactive state determines that the mobile application has not caused a notification to be output by the mobile device during the first predetermined time period.

4. The method of claim 1, wherein determining that the mobile application has been in the inactive state determines that the mobile application has not been launched by a user during the first predetermined time period.

5. The method of claim 1, wherein determining that the mobile application has been in the inactive state is further based on not receiving, via an input interface of the computing device, an indication of a user's desire to keep the mobile application active.

6. The method of claim 1, wherein determining that the mobile application has been in the inactive state is further based upon the first predetermined time period being marked by conventional time or is marked by the amount of time the mobile device has had both the battery and a screen on.

7. The method of claim 1, wherein restricting the mobile application from accessing the one or more resources of the computing device restricts the mobile application from accessing a network.

8. The method of claim 1, placing the mobile application in the idle state further comprises delaying, by the processor, execution of sync jobs of the mobile application.

9. A system comprising:
   one or more processors;
   a memory coupled to the one or more processors and storing instructions that, when executed by the one or more processors, cause the system to:
      determine that a mobile application installed on the system has been in an inactive state, the determination based on a first predetermined time period during which the mobile application is granted access to, but does not invoke an active function accessing, one or more resources of the system;
      responsive to determining that the mobile application has been in the inactive state, place the mobile application in an idle state, the idle state a state in which battery saving restrictions are imposed upon the mobile application that restrict the mobile application from accessing the one or more resources;
      responsive to receiving a signal from another mobile application associated with a particular priority classification, temporarily remove the mobile application from the idle state based on a second predetermined time period and place the mobile application in an active state until expiration of the second predetermined time period, the active state a state in which:
         the battery saving restrictions are removed from the mobile application and the mobile application is granted access to the one or more resources; and
         the mobile application completes the active function, the active function accessing the one or more resources.

10. The system of claim 9, wherein determining that the mobile application has been in the inactive state determines that the mobile application has not had a process running in the foreground of the mobile device for the first predetermined time period.

11. The system of claim 9, wherein determining that the mobile application has been in the inactive state determines that the mobile application has not caused a notification to be output by the mobile device during the first predetermined time period.

12. The system of claim 9, wherein determining that the mobile application has been in the inactive state determines that the mobile application has not been launched by a user during the first predetermined time period.

13. The system of claim 9, wherein determining that the mobile application has been in the inactive state is further based on not receiving, via an input interface of the system, an indication of a user's desire to keep the mobile application active.

14. A non-transitory computer-readable medium storing instructions that, when executed by one or more processors, cause a first computing device to:
   determine that a mobile application has been in an inactive state, the determination based on a first predetermined time period during which the mobile application is granted access to, but does not an active function accessing, one or more resources of the computing device;
   responsive to determining that the mobile application has been in the inactive state, place the mobile application in an idle state, the idle state a state in which battery saving restrictions are imposed upon the mobile application that restrict the mobile application from accessing the one or more resources; and
   responsive to receiving a signal from another mobile application associated with a particular priority classification, temporarily remove the mobile application from the idle state based on a second predetermined time period and place the mobile application in an active state for a duration of the second predetermined time period, the active state a state in which:
      the battery saving restrictions are removed from the mobile application and the mobile application is granted access to the one or more resources; and the mobile application completes the active function, the active function accessing the one or more resources.

15. The non-transitory computer-readable medium of claim 14, wherein determining that the mobile application has been in the inactive state determines that the mobile application has not had a process running in the foreground of the mobile device for the first predetermined time period.

16. The method of claim 1 further comprising receiving, by the processor, a signal indicating that the mobile device has been plugged into a power source, and responsive to receiving the signal, removing, by the processor, the mobile application from the idle state and granting the mobile application access to the one or more resources.

17. The method of claim 1, wherein the battery saving restrictions imposed upon the mobile application activate a firewall associated with the mobile application to prevent the mobile application from accessing a network.

18. The system of claim 9, wherein the battery saving restrictions imposed upon the mobile application prevent the mobile application from accessing resources that would execute syncs, jobs, and/or alarms of the mobile application.

19. The system of claim 9, wherein the signal is a push message delivered by an application associated with a push messaging service.

\* \* \* \* \*